US006315198B1

(12) United States Patent
Lenglart et al.

(10) Patent No.: US 6,315,198 B1
(45) Date of Patent: Nov. 13, 2001

(54) KEY CABINET FOR EQUIPPING AN ACCESS CONTROL SYSTEM AND ACCESS CONTROL METHOD AND SYSTEM USING THIS KEY CABINET

(75) Inventors: Pascal Lenglart, Gif sur Yvette; Christophe De Rasse, Longjumeau, both of (FR)

(73) Assignee: ALCEA, Courtaboeuf (FR)

( * ) Notice: Subject to any disclaimer, the term of this patent is extended or adjusted under 35 U.S.C. 154(b) by 0 days.

(21) Appl. No.: 09/035,023

(22) Filed: Mar. 5, 1998

Related U.S. Application Data

(60) Provisional application No. 60/045,988, filed on May 8, 1997.

(30) Foreign Application Priority Data

Mar. 5, 1997 (FR) .................................................. 97 02599

(51) Int. Cl.[7] ........................................................ G06K 5/00
(52) U.S. Cl. ........................ 235/382; 235/382.5; 235/380
(58) Field of Search ................................ 235/385, 382.5, 235/382, 380

(56) References Cited

U.S. PATENT DOCUMENTS

| | | | | |
|---|---|---|---|---|
| 4,549,170 | | 10/1985 | Serres et al. | 340/568 |
| 4,673,915 | * | 6/1987 | Cobb | 340/330 |
| 4,681,504 | | 7/1987 | Welch, Sr. | 414/268 |
| 4,783,655 | * | 11/1988 | Cobb et al. | 340/825.49 |
| 4,937,437 | * | 6/1990 | Ferguson | 235/382 |
| 5,014,049 | * | 5/1991 | Bosley | 340/825.31 |
| 5,038,023 | | 8/1991 | Saliga | 235/385 |
| 5,212,649 | | 5/1993 | Pelletier et al. | 364/479 |
| 5,245,329 | * | 9/1993 | Gokcebay | 340/825.31 |
| 5,337,043 | * | 8/1994 | Gokcebay | 340/825.31 |
| 5,347,267 | * | 9/1994 | Murray | 340/825.31 |
| 5,389,919 | * | 2/1995 | Warren et al. | 340/825.31 |
| 5,552,777 | * | 9/1996 | Gokcebay et al. | 340/825.31 |
| 5,625,349 | * | 4/1997 | Disbrow et al. | 340/825.31 |

FOREIGN PATENT DOCUMENTS

| | | |
|---|---|---|
| 41 01 211 | 7/1992 | (DE) . |
| 0 097 538 | 1/1984 | (EP) . |
| 2 717 932 | 6/1996 | (FR) . |
| 2 721 734 | 8/1996 | (FR) . |
| 2 146 154 | 4/1985 | (GB) . |
| WO 86/06858 | 11/1986 | (WO) . |
| WO 95/04324 | 2/1995 | (WO) . |

OTHER PUBLICATIONS

Jerry Levine, "Key Systems' Security Key Dispenser", Locksmith Ledger International, pp. 17, 20 and 22, vol. 55, No. 7, Jun. 1, 1995.

* cited by examiner

*Primary Examiner*—Karl D. Frech
(74) *Attorney, Agent, or Firm*—Young & Thompson

(57) ABSTRACT

Key cabinet (AC1) for equipping an access control system (1) comprising a plurality of devices for reading data associated with personal identification means (EI), access control management means in particular comprising decision making means for controlling accesses and means for retaining a trace of the events occurring in this system, this cabinet (AC1) comprising means (Ci,j) adapted to receive a set of keys (CL) and means (TL) for controlling access to these receiving means.

This cabinet (AC1) is connected to the access control system (1) by insertion between a reader device and its controller means. It furthermore comprises means (SC, CE1) for generating a virtual badge corresponding to any change of state, this virtual badge then being transferred to decision making means.

Application in particular for equipping existing access control systems with key cabinets.

15 Claims, 4 Drawing Sheets

SD
CE
AC
EI
TL

SP
ED
AC1
CE1
CO
BZ
VO
AF
KB
BP
SA
CS
CP
MC
SC
CL
TL
EI
1

KEY CABINET FOR EQUIPPING AN ACCESS CONTROL SYSTEM AND ACCESS CONTROL METHOD AND SYSTEM USING THIS KEY CABINET

CROSS-REFERENCE TO RELATED APPLICATIONS

This application claims the benefit under 35 U.S.C. 119(e) of provisional application No. 60/045,988 filed May 8, 1997.

BACKGROUND OF THE INVENTION

The present invention relates to a key cabinet for equipping an access control system. It also relates to an access control method and system using this key cabinet.

In current access control system, the management of access keys used by authorized persons is increasingly tending to include control of access to one or more key cabinets. In fact, in association with a main access control by badges, a key cabinet constitutes a useful complement for managing additional doors not managed by badge readers. There are already known, in particular from the documents FR2721734 and FR2717932, installations for the selective distribution and for the controlled retrieval of objects, of keys in particular.

The document U.S. Pat. No. 5038023 discloses a system for storing and monitoring keys provided with bar coded tags in a drawer.

The document EP0097538 discloses a system for managing a key panel, comprising means for successively reading and storing combinations and means for detecting the presence or absence of keys on said panel.

These installations make it possible to control and issue keys which are kept locked on a distribution panel and are released only after validation and authentication of an issue request. The key cabinets thus managed can be connected to a computer system and be associated with access and intrusion controls.

But when it is a matter of completing existing access control systems, in particular large systems, in practice it proves difficult to make the data related to the monitoring of the movements of keys within a key cabinet consistent with the flow of access control data generated within a pre-existing access control system. The key cabinet is therefore often perceived as a specific peripheral and the data associated with it are also subjected to specific processing. This gives rise to additional costs in terms of the installation and the writing of specific interface software.

SUMMARY OF THE INVENTION

The purpose of the invention is to overcome these disadvantages by proposing a key cabinet for equipping an access control system comprising a plurality of devices for reading data associated with personal identification means, controller means connected to each of said reader devices and to access control management means in particular comprising decision making means for controlling accesses and means for retaining a trace of the events occurring in this system, this cabinet comprising means adapted to receive a set of keys and means for detecting any change in the state of the keys contained in said cabinet.

According to the invention, the key cabinet is arranged to be inserted between a reader device and the access control system via said controller means associated with said reader device, and further comprises means for detecting any change in state of the keys contained in said cabinet and means for generating a virtual badge number corresponding to any change of state, this virtual badge thin being transferred to decision making means.

In this way, a key cabinet according to the invention can be installed within an existing access control system in substitution for a simple badge reader, and the changes of state of the keys contained in this cabinet, by being rendered equivalent to virtual badges, will be able to be stored, filed and processed in the same way as any other events occurring in the access control system. It is therefore no longer necessary to provide difficult adaptations of the hardware and of the software when it is desired to install a key cabinet within an access control system.

The access control means preferably comprise a device for reading personal identification means constituting a real badge and the key cabinet according to the invention furthermore comprises means for transferring this real badge to decision making means within the access control system.

In a practical embodiment of the invention, the means for receiving keys comprise key contacts and the change of state detection means comprise means for examining the state of said key contacts. These key contacts are preferably arranged in a matrix pattern.

In a first embodiment of a key cabinet according to the invention, furthermore comprising a door with controlled opening, the means for controlling the opening of this door are located outside of said cabinet.

In a second embodiment, means for controlling the opening of the door of the cabinet are directly integrated with the latter.

According to another aspect of the invention, there is proposed a system for the control of access to sites or equipments, comprising:

- personal identification means held by a number of persons,
- a plurality of devices for reading information transmitted by the identification means,
- decision making means for commanding or not commanding access for a person in response to an access request,
- means for retaining a trace of any event occurring in this system, and
- central means for managing the controls and of access request.

This access control system is characterized in that it furthermore comprises at least one key cabinet according to the invention, this key cabinet being connected to the access control system by insertion between a personal identification means reader device and controller means associated to said reader device. It furthermore comprises means for sorting, from among all of the events whose traces are retained, those events relating to the reader device associated with the key cabinet.

According to yet another aspect of the invention, there is proposed an access control method used in the system according to the invention, comprising a test for the detection of personal identification means carried out in order to control access to the keys contained in the key cabinet according to the invention, characterized in that it furthermore comprises an examination of key contacts, a generation of a virtual badge number corresponding to a change in state of a key, and a transfer of this virtual badge to the decision making means.

In the case of detection of personal identification means, the method according to the invention furthermore comprises a transfer of a real badge associated with these personal identification means to the decision making means.

Furthermore, an operator of the access control system can easily carry out a sort, amongst all the events which have occurred in the system and which are retained in the access control management means, of the events associated with the virtual badges issued from a key cabinet in to the invention.

BRIEF DESCRIPTION OF THE DRAWINGS

Other features and advantages of the invention furthermore appear in the following description and in the accompanying drawings, given by way of non-limitative example.

DESCRIPTION OF THE PREFERRED EMBODIMENTS

Embodiments of the key cabinet according to the invention will now be described with reference to said figures.

Figures 1, 1A:
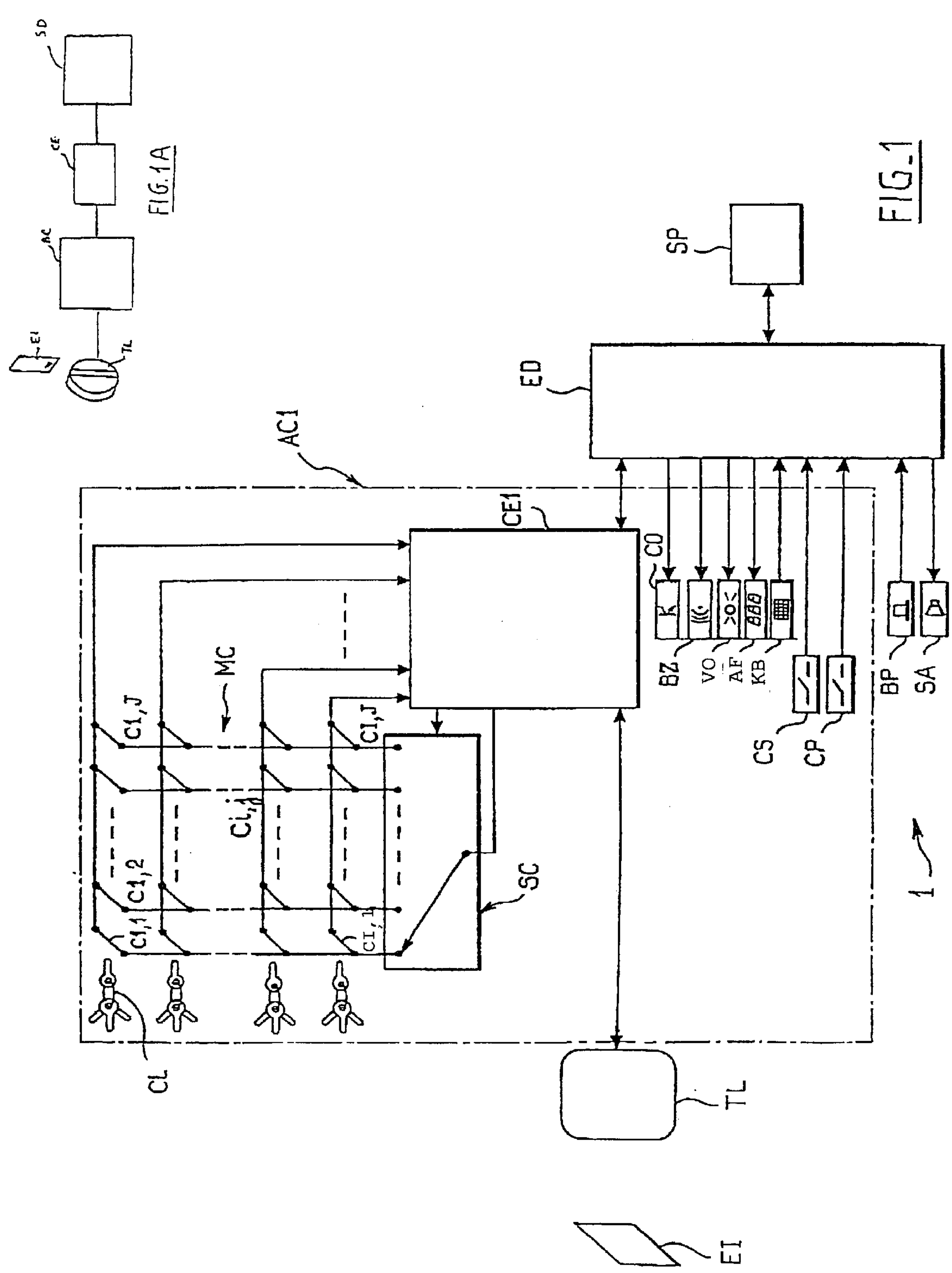
FIG. 1 is a block diagram of a first embodiment of a key cabinet according to the invention.
FIG. 1A schematically illustrates the insertion of a key cabinet according to the invention between a reader device and a controller card connected to an access control system.

In a first embodiment, shown in FIG. 1, an access control system 1 according to the invention comprises a key cabinet AC1, a decision making equipment ED in communication wish a parameterization system SP, and a set of badges or identification equipments EI allowing access to the key cabinet AC1. The latter contains a matrix device MC comprising a set of key contacts Ci, j designed to receive a set of keys CL, an electronic device CE1 provided for managing a badge reader TL or more generally a means of detection or decoding, for analyzing the state of the key contacts by means of an examination circuit SC and for communicating with the decision making equipment ED.

More generally, as illustrated by FIG. 1A, a key cabinet AC according to the invention can be inserted between a reader device TL and an electronic controller CE associated with said reader device TL and connected to a decision making system SD.

The decision making equipment EI receives from the key, cabinet KB, signals coming from a keyboard CL, a sabotage contact signal CS, a door control signal CP (rabbet contact, end of latch contact), and delivers in return a signal commanding the opening of the door CO, a buzzer signal BZ, control signals for indicator lamps VO and control signals for displays AF. It furthermore receives a signal coming from a push-button BP and generates an alarm signal SA.

Figure 2:
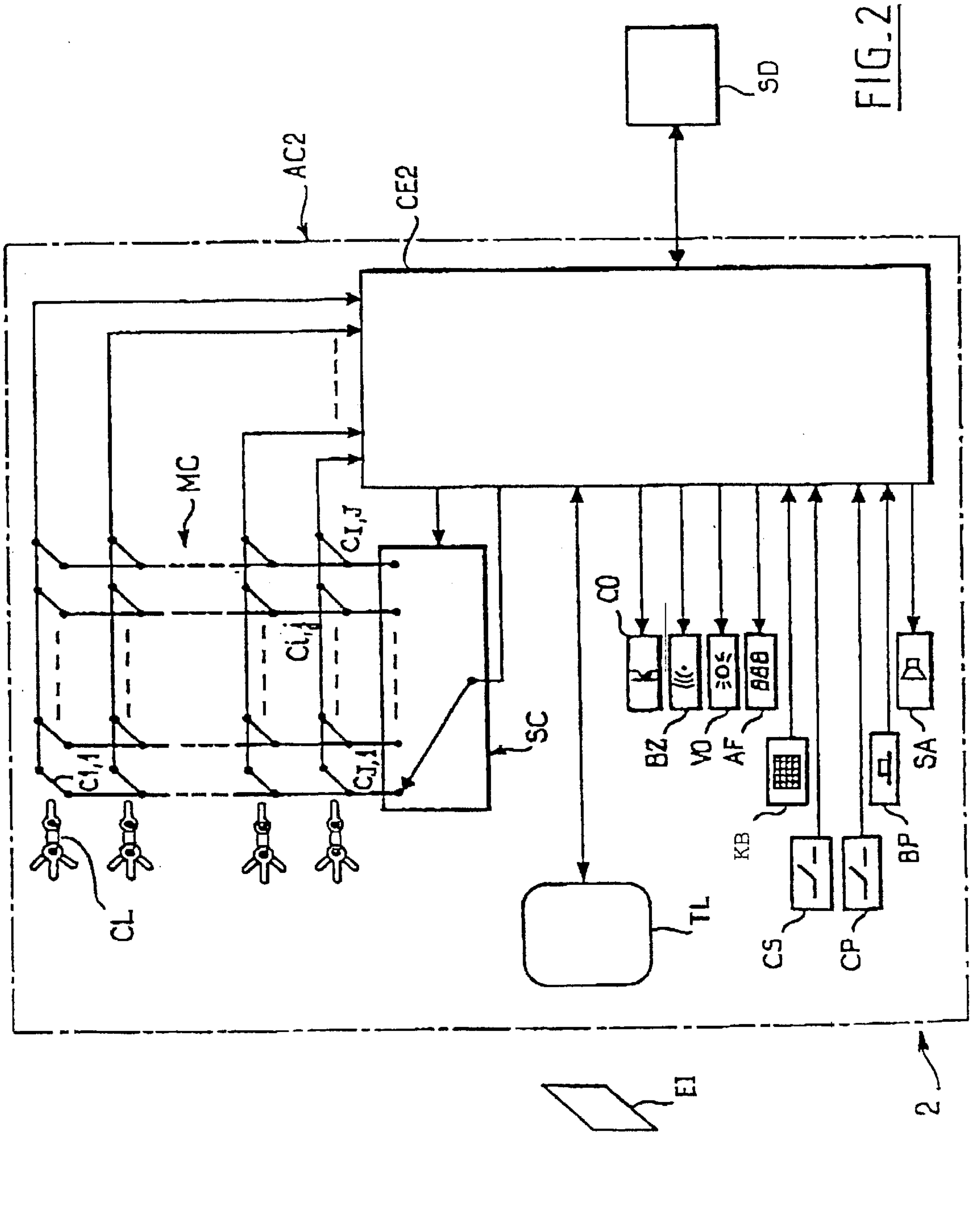
FIG. 2 is a block diagram of a second embodiment of a key cabinet according to the invention.

In a second embodiment shown in FIG. 2, in which the elements common with those of FIG. 1 have the same common references, the access control system 2 according. to the invention comprises a key cabinet AC2 comprising an electronic device CE2 providing, in addition to the management of the keys and of the badge reader TL, the signals for controlling door opening CO, buzzer control signals BZ, indicator lamp control signals VO, display control signals AF and alarm control signals SA, and the electronic device CE2 receives as input the signals coming from the keyboard KB, the sabotage contact CS, the door contact CP and the push-button BP. The electronic device CE2 is in communication with a decision making system SD.

Figure 3:
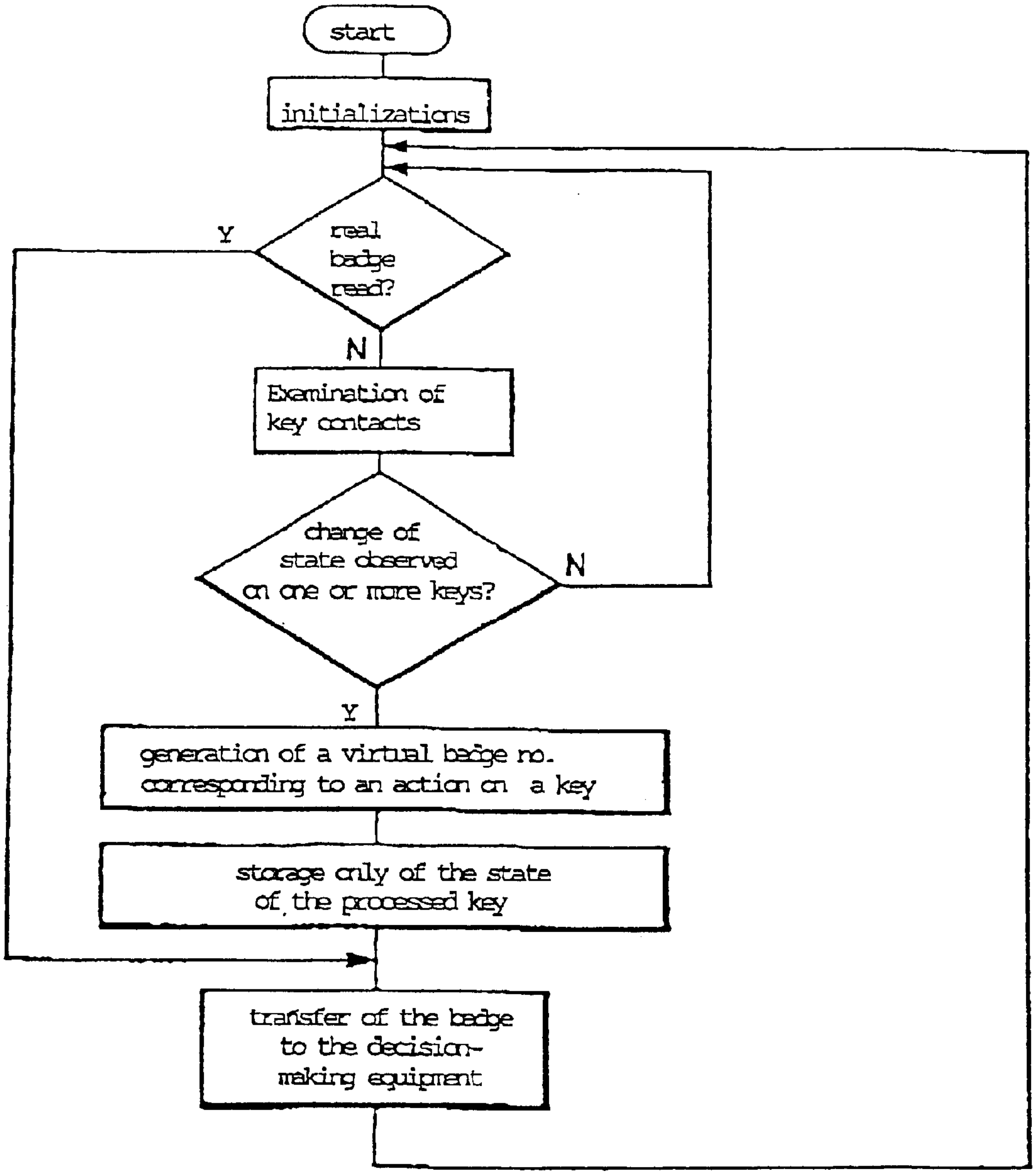
FIG. 3 is a flowchart showing the essential steps in the operation of the first embodiment of a key cabinet according to the invention.

The operation of the key cabinet AC1 will now be described with reference to the flowchart shown in FIG. 3 and to the block diagram shown in FIG. 1. After a phase of initialization of the equipments in the key cabinet, a test of reading a real badge by the reader TL is carried out. If a real badge is actually read, information from this badge is transferred by the electronic device CE1 to the decision making equipment which, after processing this badge information emits a signal CO commanding the opening of the door of the key cabinet AC1.

A continuous examination of the key contacts Ci, j is carried out by the electronic device CE1 until a change or state is observed on one of more of the key contacts Ci, j. If such is the case, the electronic device CE1 generates a virtual badge number corresponding to the action detected on a key, stores only the state of the processed key, then transfers this virtual badge information to the decision making equipment ED.

Figure 4:
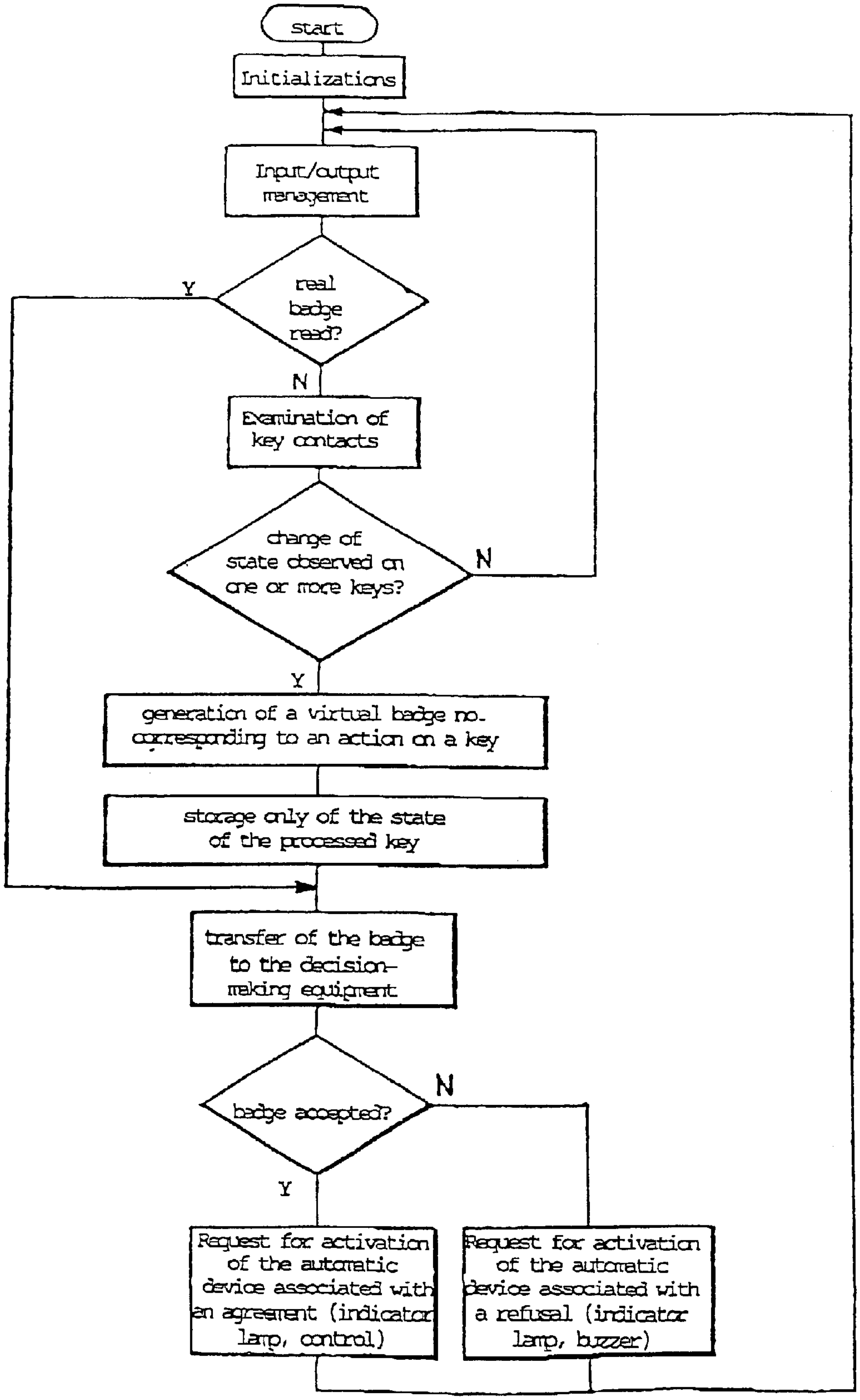
FIG. 4 is a flowchart showing the essential steps in the operation of the second embodiment of a key cabinet according to the invention.

In, the second embodiment of an access control system according to the invention, whose operation is illustrated in FIG. 4, after the transfer of a real or virtual badge information to the decision making equipment SD, a test for the acceptance of this badge is carried out. If this, badge is accepted, a request for the activation of an automatic device associated with an agreement (indicator lamp, control) is issued. In the opposite case, a request for the activation of an automatic device associated with a refusal (indicator lamp, buzzer) is issued. It should be noted that the process used in this embodiment also includes input-output management.

Because the system according to the invention generates virtual badges at each change of state of a key inside the key cabinet, it becomes very easy to monitor events and to manage the movement of keys within existing access control systems since it suffices to select the reader of the key cabinet in order to obtain the complete chronological log of actions carried out on the key cabinet. In this way there is obtained the continuously updated list of key movements and of the corresponding borrowers. It is furthermore possible to define selective rights Of access and to detect any unauthorised taking of keys. It is furthermore possible to make provision for the key cabinet according to the invention to be provided with devices for locking the keys making it possible to control their withdrawal.

A key cabinet according to the invention can thus make it possible to manage a large number of keys and procure a time and date log of all of the movements (withdrawal and return of keys) with identification of the borrower. In practice, a key cabinet according to the invention is powered by the mains and has a back-up battery. It can for example be connected to the management unit of the access control system by an RS485 type interface, or in the case of remote systems, via a modem through a telecommunications link, in particular the switched telephone network.

The invention is not of course limited to the embodiments which have just been described and numerous arrangements can be added to these examples without departing from the scope of the invention. Thus, the number of keys controlled within a key cabinet according to the invention can be any number whatsoever. The output and input peripherals of the electronic management devices and of the decision making equipments can be different from those which have just been described. Furthermore, it is possible to provide for a key cabinet according to the invention to be provided with devices for locking the keys contained inside the cabinet.

What is claimed is:

1. A key cabinet for an access control system, the access control system including a reading device for reading an identification badge, the reading device having a controller means associated therewith, and access control management means having decision making means for controlling access based on information read by the reading device and means for storing events occurring in the access control system, the access control management means being connected to the reading device through the controller means, wherein the key cabinet is connected between the reader device and the access control management means through the controller means, and comprises key receiving means for receiving plural keys, change of state detection means connected to said key receiving means for detecting a change of state of the plural keys in the key cabinet, and means for generating virtual badge information corresponding to the change of state detected by said detection means and for providing the virtual badge information to the decision making means.

2. The key cabinet of claim 1, wherein a data format of information from the identification badge read by said reading device is the same as a data format for the virtual badge information.

3. Key cabinet according to claim 1, wherein said key receiving means comprise a plurality of contacts and said change of state detection means comprise means for examining a state of said plurality of key contacts.

4. Key cabinet according to claim 3, wherein said plurality of key contacts are arranged in a matrix pattern.

5. Key cabinet according to claim 1, further comprising means for storing the state of each key of said plurality keys.

6. Key cabinet according to claim 1, further comprising a door having me for controlled opening, wherein said means for controlled opening of said door are located outside of the key cabinet.

7. Key cabinet according to claim 1, further comprising a door and means for controlled opening of said door.

8. System for the control of access to sites or equipments having at least one key cabinet according to claim 1, the system further comprising:

plural of the personal identification means held by a plurality of persons, a plurality of the reading devices for reading information transmitted by said personal identification means, wherein each said key cabinet is connected to the access control system by insertion between one of said plurality of reading device and the controller means associated with said one of said plurality of reading devices.

9. System according to claim 8, further comprising means for sorting, from among all of the events whose records are retained, those events relating to said one of Said plurality of reader devices associated with the key cabinet.

10. An access control method used with an access control system ha wine a key cabinet, the access control system including a reading device for reading an identification badge, the reading device having a controller means associated therewith, and access control management means having decision making means for controlling access based on information read by the reading device and means for storing events occurring in the access control system , the access control management means being connected to the reading device through the controller means, the key cabinet being connected between the reader device and the access control management means through the controller means and comprising key receiving means for receiving plural keys, change of state detection means connected to said key receiving means for detecting a change of state of the plural keys in the key cabinet, and means for generating virtual badge information corresponding to the change of state detected by said detection means and for providing the virtual badge information to the decision making means, the method comprising the steps of:

evaluating in the decision making means whether the read identification badge is authorized to have access to the plural keys in the key cabinet;

generating the virtual badge information for a key for which a change of state is detected by said detection means; and transferring the generated virtual badge information to the decision making means.

11. Method according to claim 10, further comprising a step wherein the decision making means accepts the transferred virtual badge information.

12. Method according to claim 11, further comprising, in the case of detection of personal identification information, a step of transferring real badge information associated with the plurality of personal identification means to the decision making means.

13. Method according to claim 12, further comprising the step of sorting events associated with virtual badge information from all the events that have occurred in the system and that have been retained in the access control management means.

14. The method of claim 10, wherein a data format of information read from the identification badge by said reading device is the same as a date format for the virtual badge information.

15. A key cabinet for an access control system, the access control system including a reading device for reading first identifier information in a first signal format from an actual identification device, the reading device having a controller associated therewith, and access control management means for controlling access based on the first identifier information read by the reading device, the access control management means being connected to the reading device through the controller, wherein the key cabinet is connected to the controller between the reader device and the access control management means, and comprises key receiving means for receiving plural keys, detector means connected to said key receiving means for detecting whether each of the plural keys is present in the key cabinet, and a processor for generating second identifier information in the first signal format that indicates movement of the plural keys to and from said key receiving means and for providing the second identifier information to the access control management means.

* * * * *